(12) United States Patent
Chia

(10) Patent No.: US 7,089,072 B2
(45) Date of Patent: Aug. 8, 2006

(54) SEMICONDUCTOR MANUFACTURING FAULT DETECTION AND MANAGEMENT SYSTEM AND METHOD

(75) Inventor: Tong Lung Chia, Jhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/853,790

(22) Filed: May 26, 2004

(65) Prior Publication Data
US 2005/0278053 A1    Dec. 15, 2005

(51) Int. Cl.
*G06F 19/00* (2006.01)

(52) U.S. Cl. .................................................. 700/110

(58) Field of Classification Search ............. 700/11, 700/12, 19–28, 78–82, 96, 108–110, 117–121; 714/797; 326/11, 35
See application file for complete search history.

(56) References Cited

U.S. PATENT DOCUMENTS

| | | | | |
|---|---|---|---|---|
| 4,218,671 A | * | 8/1980 | Lewis | 187/394 |
| 4,804,515 A | * | 2/1989 | Crew et al. | 376/216 |
| 4,868,826 A | * | 9/1989 | Smith et al. | 714/10 |
| 4,873,685 A | * | 10/1989 | Millis, Jr. | 714/797 |
| 5,057,994 A | * | 10/1991 | Spiller | 700/79 |
| 5,382,950 A | * | 1/1995 | Gronemeyer | 340/825.5 |
| 6,041,315 A | | 3/2000 | Pollin | |
| 6,049,578 A | * | 4/2000 | Senechal et al. | 376/215 |
| 6,199,422 B1 | | 3/2001 | Boerhout et al. | |
| 6,401,098 B1 | | 6/2002 | Moulin | |
| 6,415,259 B1 | | 7/2002 | Wolfinger et al. | |
| 6,442,570 B1 | | 8/2002 | Wu | |
| 6,456,364 B1 | | 9/2002 | Imai | |
| 6,532,550 B1 | * | 3/2003 | Crew et al. | 714/11 |
| 6,539,518 B1 | | 3/2003 | Fang et al. | |
| 6,701,258 B1 | * | 3/2004 | Kramb et al. | 702/33 |
| 6,850,807 B1 | * | 2/2005 | Tahira | 700/79 |

OTHER PUBLICATIONS

Goodlin, Brian E., et al., "Simultaneous Fault Detection and Classification for Semiconductor Manufacturing Tools", 201st Meeting of the Electrochemical Society, International Symposium on Plasma Processing XIV, May 2002, 16 pages.

* cited by examiner

*Primary Examiner*—Maria N. Von Buhr
(74) *Attorney, Agent, or Firm*—Haynes and Boone, LLP

(57) ABSTRACT

The present disclosure provides a semiconductor manufacturing fault detection and management system and method for monitoring at least one manufacturing entity to detect state changes.

31 Claims, 6 Drawing Sheets

SEMICONDUCTOR MANUFACTURING FAULT DETECTION AND MANAGEMENT SYSTEM AND METHOD

BACKGROUND

The present disclosure relates generally to the field of semiconductor manufacturing and, more particularly, to a semiconductor manufacturing fault detection and management system and method.

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level, the IC's active device density (i.e., the number of devices per IC area) and functional density (i.e., the number of interconnected devices per IC area) has become limited by the fabrication process.

Furthermore, as the IC industry has matured, the various operations needed to produce an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

The complexity of process steps and time-consuming process of manufacturing advanced semiconductor devices mandates efficient processing systems and methods, specifically the methods of detection and management of system errors, excursions, and fault detection of systems in a semiconductor fabrication environment. Common practice for error detection systems has been to allow service clients to collect or retrieve trap messages or errors and to then send the information to a system administrator to perform any system checking or corrective action. However, sometimes false error messages or trap messages may be sent to an administrator due to a malfunctioning or unstable checking system, unstable or malfunctioning network interconnects or devices, or unstable or busy application service system.

Accordingly, what is needed is a system and method for providing detection and management of system faults or errors in a semiconductor manufacturing environment.

DETAILED DESCRIPTION

Figure 1:
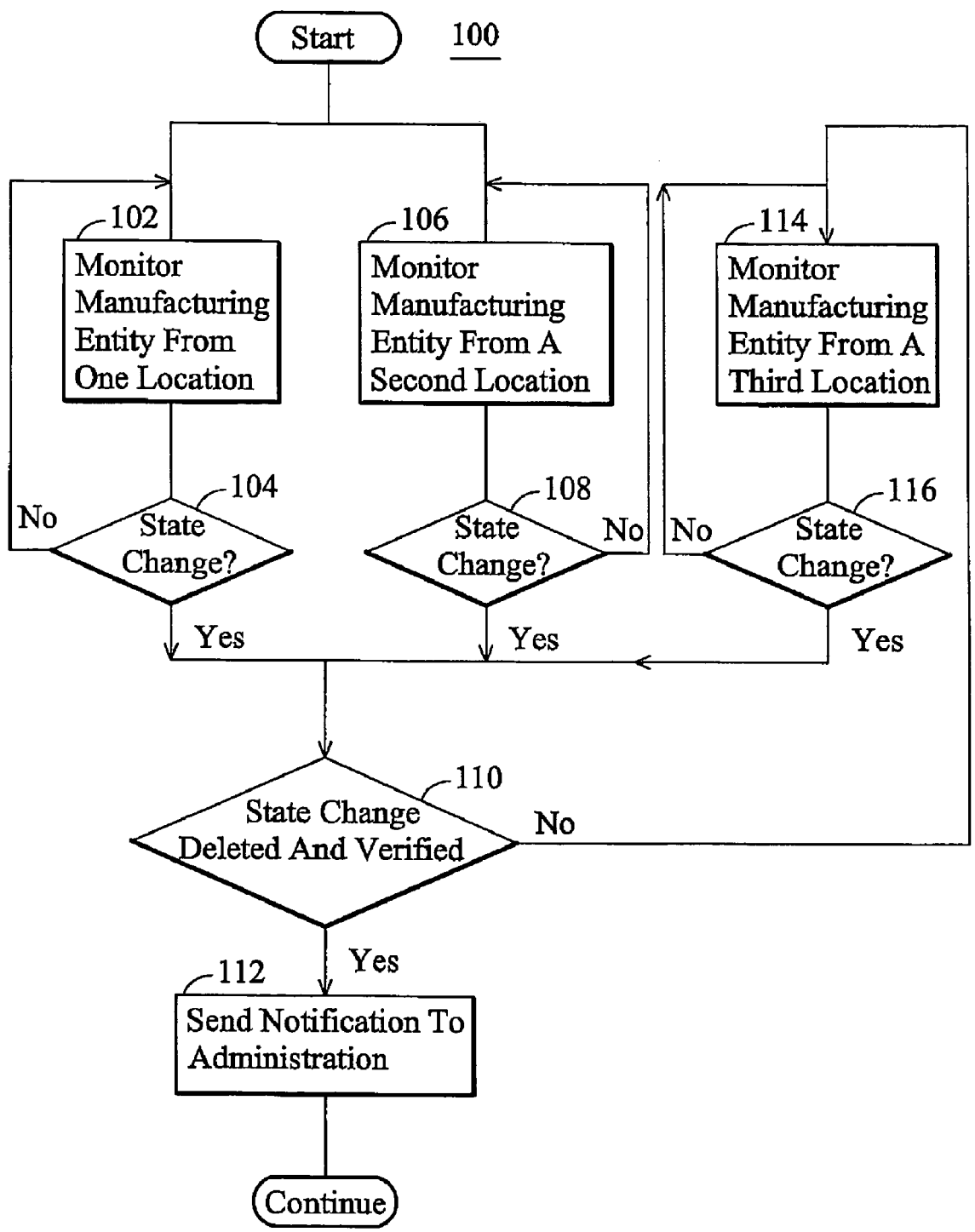
FIG. 1 illustrates a method for providing fault detection and management in a semiconductor manufacturing environment.

The present disclosure relates generally to the field of semiconductor manufacturing and, more particularly, to a system and method for providing detection and management of system errors in a semiconductor manufacturing environment. It is understood, however, that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, flowchart 100 of a method for detecting faults in at least one semiconductor manufacturing entity in a semiconductor manufacturing environment is provided. In step 102, the semiconductor manufacturing entity is monitored from one location to determine whether the manufacturing entity experienced a state change, step 104. The semiconductor manufacturing entity is also separately being monitored from a second location, step 106, to identify the existence of a state change, step 108. A state change may be any change in the manufacturing entity. The stage change may be represented by a trap, interrupt or exception typically cause by some exceptional situation. Alternatively, an entity parameter may be monitored to determine when the parameter changes signifying a state change.

In order to verify that a state change in the manufacturing entity occurred, the state change inquiries from the two locations are compared to determine if state changes are detected at both locations, step 110. If a state change is detected at both locations, then the state change is verified and a notification is generated, step 112, which may be sent to an administrator to be logged or to request any type of action, such as, for example, maintenance or another type of corrective action. If no state change is detected, then the monitoring continues at the two locations, steps 104 and 108.

If a state change is detected by at least one of the locations but not verified, then one of the monitoring locations may be malfunctioning and, in one embodiment, monitoring of the manufacturing entity may occur from a third location, step 114, to determine whether the manufacturing entity encountered a state change. The monitoring from a third location can replace the malfunctioning monitoring effort and be detected at step 110.

Many variations of method 100 many be implemented. For example, all three monitoring locations may be detected simultaneously at step 110. A state change notification may be sent, step 112 when at least two of the monitoring locations detect a state change. In such case, it may be assumed that the location that did not detect a state change may be malfunctioning and a monitoring malfunction notification may be generated to seek corrective action.

In another embodiment, the manufacturing entity may be monitored from only one location, step 102, until a state change is detected, step 104, at which point the manufacturing entity is monitored from a second location, step 106, to identify the existence of a state change, step 108. If a state change is detected at both locations, then the state change is verified, step 110. If a state change is only detected at one location, step 110, then an assumption is made that the first monitoring location is malfunctioning and that the third monitoring location step 114 is needed to monitor the manufacturing entity for a state change step 116 in place of the first monitoring entity.

It is contemplated that several modification or enhancement to the method shown in FIG. 1 may be made without departing from the spirit of the disclosure. For example, additional steps may be added so that functionality of each of the monitoring locations may be audited by at least one of the other locations on a periodic or constant basis and notifications may be sent when an errors in the monitoring locations are detected. Any condition may be monitored to assure accurate functionality. Also, the monitoring activities may occur from any number of locations and are not limited to three locations.

The separate locations of the monitoring activities may be affected by each monitoring location being in a separate piece of hardware in the same physical location. Alternatively, the separate monitoring entities could be physically located in separate environments.

Figure 2:
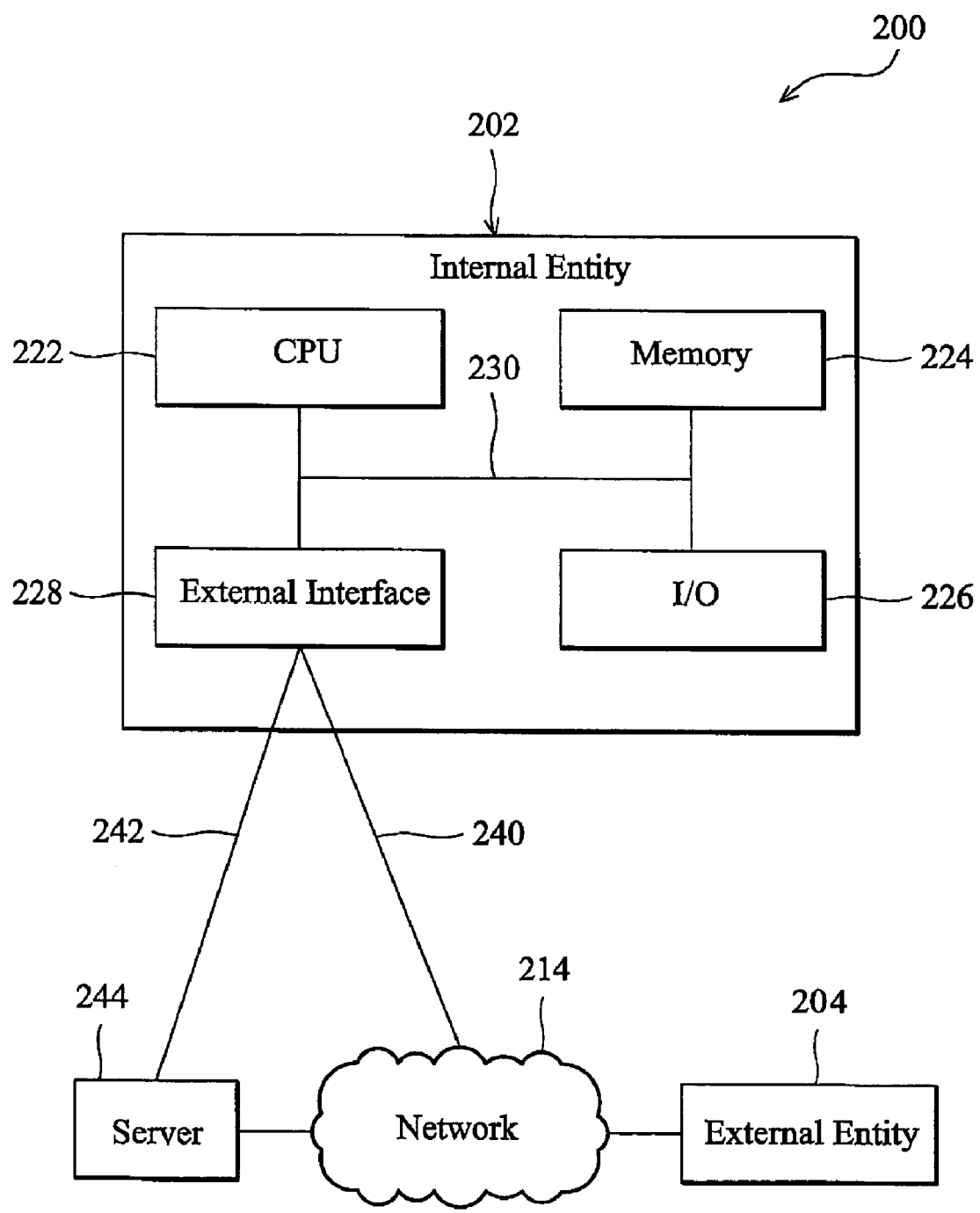
FIG. 2 is an illustration of a virtual IC fabrication system that can benefit from one embodiment of the present disclosure.

Referring now to FIG. 2, a virtual IC fabrication system (a "virtual fab") 200 is one embodiment of a system that can be used to implement the method 100 of FIG. 1. The virtual fab includes a plurality of entities, represented by one or more internal entities 202 and one or more external entities 204 that are connected by a communications network 214. The network 214 may be a single network or may be a variety of different networks, such as an intranet and the Internet, and may include both wireline and wireless communication channels.

Each of the entities 202, 204 may include one or more computing devices such as personal computers, personal digital assistants, pagers, cellular telephones, and the like. For the sake of example, the internal entity 202 is expanded to show a central processing unit (CPU) 222, a memory unit 224, an input/output (I/O) device 226, and an external interface 228. The external interface may be, for example, a modem, a wireless transceiver, and/or one or more network interface cards (NICs). The components 222–228 are interconnected by a bus system 230. It is understood that the internal entity 202 may be differently configured and that each of the listed components may actually represent several different components. For example, the CPU 222 may actually represent a multi-processor or a distributed processing system; the memory unit 224 may include different levels of cache memory, main memory, hard disks, and remote storage locations; and the I/O device 226 may include monitors, keyboards, and the like.

The internal entity 202 may be connected to the communications network 214 through a wireless or wired link 240, and/or through an intermediate network 242, which may be further connected to the communications network. The intermediate network 242 may be, for example, a complete network or a subnet of a local area network, a company wide intranet, and/or the Internet. The internal entity 202 may be identified on one or both of the networks 214, 242 by an address or a combination of addresses, such as a media control access (MAC) address associated with the network interface 228 and an Internet protocol (IP) address. Because the internal entity 202 may be connected to the intermediate network 242, certain components may, at times, be shared with other internal entities. Therefore, a wide range of flexibility is anticipated in the configuration of the internal entity 202. Furthermore, it is understood that, in some implementations, a server 244 may be provided to support multiple internal entities 202. In other implementations, a combination of one or more servers and computers may together represent a single entity.

In the present example, the internal entities 202 represents those entities that are directly responsible for producing the end product, such as a wafer or individually tested IC devices. Examples of internal entities 202 include an engineer, customer service personnel, an automated system process, a design or fabrication facility and fab-related facilities such as raw-materials, shipping, assembly or test. Examples of external entities 204 include a customer, a design provider; and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 202–204 may be concentrated at a single location or may be distributed, and that some entities may be incorporated into other entities. In addition, each entity 202, 204 may be associated with system identification information that allows access to information within the system to be controlled based upon authority levels associated with each entities identification information.

The virtual fab 200 enables interaction among the entities 202–204 for purposes related to IC manufacturing, as well as the provision of services. In the present example, IC manufacturing can include one or more of the following steps:

receiving or modifying a customer's IC order of price, delivery, and/or quantity;
receiving or modifying an IC design;
receiving or modifying a process flow;
receiving or modifying a circuit design;
receiving or modifying a mask change;
receiving or modifying testing parameters;
receiving or modifying assembly parameters; and
receiving or modifying shipping of the ICs.

One or more of the services provided by the virtual fab 200 may enable collaboration and information access in such areas as design, engineering, and logistics. For example, in the design area, the customer 204 may be given access to information and tools related to the design of their product via the fab 202. The tools may enable the customer 204 to perform yield enhancement analyses, view layout information, and obtain similar information. In the engineering area, the engineer 202 may collaborate with other engineers 202 using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired.

Another service provided by the virtual fab 200 may integrate systems between facilities, such as between a facility 204 and the fab facility 202. Such integration enables facilities to coordinate their activities. For example, integrating the design facility 204 and the fab facility 202 may enable design information to be incorporated more efficiently into the fabrication process, and may enable data from the fabrication process to be returned to the design facility 204 for evaluation and incorporation into later versions of an IC.

Figure 3:
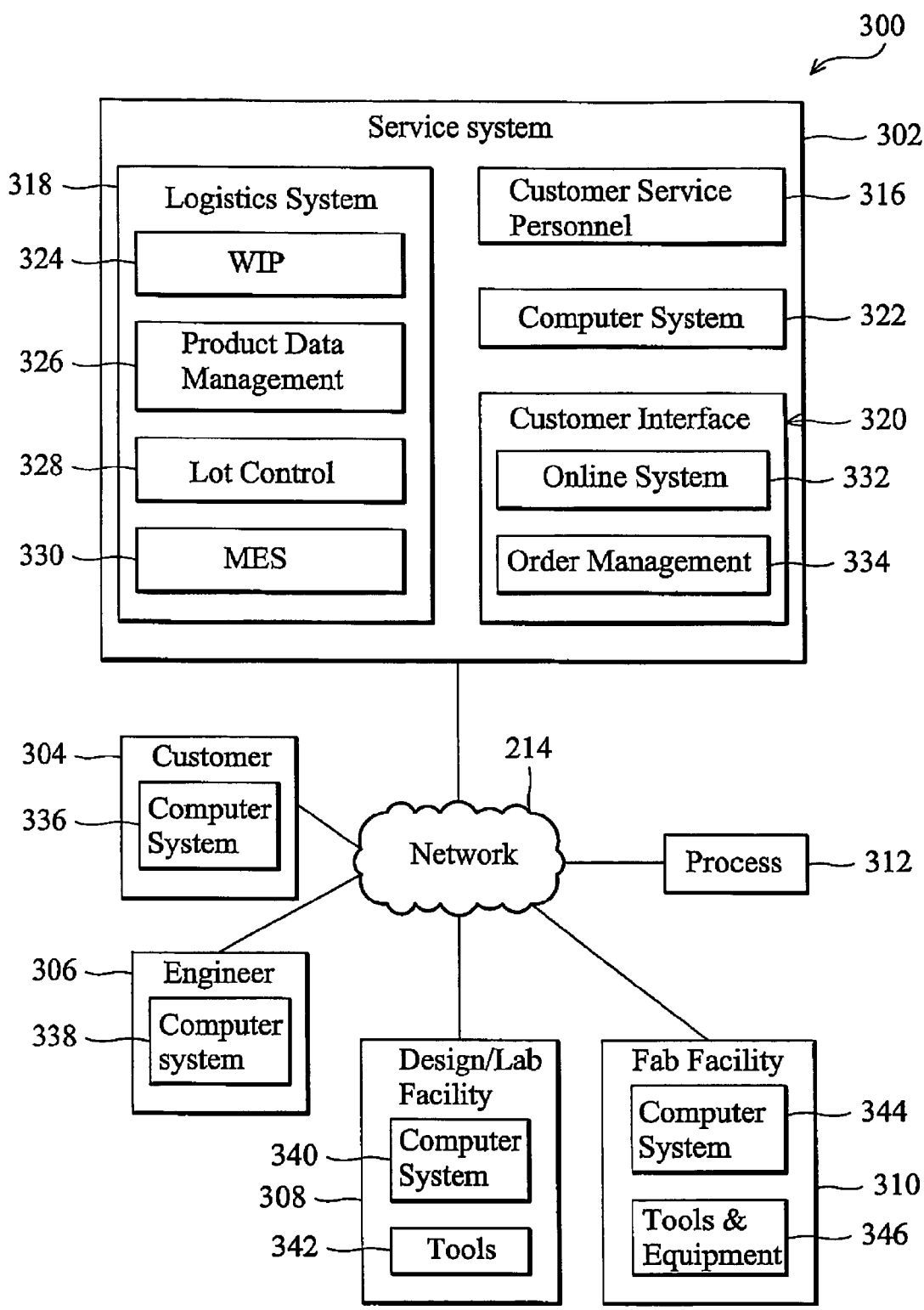
FIG. 3 is an illustration of a more detailed example of the system of FIG. 2.

Referring now to FIG. 3, a virtual fab 300 illustrates a more detailed example of the virtual fab 200 of FIG. 2. It is understood, however, that the details mentioned and described in FIG. 3 are provided for the sake of example, and that other examples can also be used.

The virtual fab 300 includes a plurality of entities 302, 304, 306, 308, 310, and 312 that are connected by a communications network 214. In the present example, the entity 302 represents a service system, the entity 304 represents a customer, the entity 306 represents an engineer, the entity 308 represents a design/lab facility for IC design and testing, the entity 310 represents a fab facility, and the entity 312 represents a process (e.g., an automated fabrication process) either inside the fab 310, or at another facility. Each entity may interact with other entities and may provide services to and/or receive services from the other entities.

The service system 302 provides an interface between the customer and the IC manufacturing operations. For example, the service system 302 may include customer service personnel 316, a logistics system 318 for order handling and tracking, and a customer interface 320 for enabling a customer to directly access various aspects of an order.

The logistics system 318 may include a work-in-process (WIP) inventory system 324, a product data management system 326, a lot control system 328, and a manufacturing execution system (MES) 330. The WIP inventory system 324 may track working lots using a database (not shown). The product data management system 326 may manage product data and maintain a product database (not shown). The product database could include product categories (e.g., part, part numbers, and associated information), as well as a set of process stages that are associated with each category of products. The lot control system 328 may convert a process stage to its corresponding process steps.

The MES 330 may be an integrated computer system representing the methods and tools used to accomplish production. In the present example, the primary functions of the MES 330 may include collecting data in real time, organizing and storing the data in a centralized database, work order management, workstation management, process management, inventory tracking, and document control. The MES 330 may be connected to other systems both within the service system 302 and outside of the service system 302. Examples of the MES 330 include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 330 may include such information as a process step sequence for each product.

The customer interface 320 may include an online system 332 and an order management system 334. The online system 332 may function as an interface to communicate with the customer 304, other systems within the service system 302, supporting databases (not shown), and other entities 306–312. The order management system 334 may manage client orders and may be associated with a supporting database (not shown) to maintain client information and associated order information.

Portions of the service system 302, such as the customer interface 320, may be associated with a computer system 322 or may have their own computer systems. In some embodiments, the computer system 322 may include multiple computers (FIG. 4), some of which may operate as servers to provide services to the customer 304 or other entities. The service system 302 may also provide such services as identification validation and access control, both to prevent unauthorized users from accessing data and to ensure that an authorized customer can access only their own data.

The customer 304 may obtain information about the manufacturing of its ICs via the virtual fab 300 using a computer system 336. In the present example, the customer 304 may access the various entities 302, 306–312 of the virtual fab 300 through the customer interface 320 provided by the service system 302. However, in some situations, it may be desirable to enable the customer 304 to access other entities without going through the customer interface 320. For example, the customer 304 may directly access the fab facility 310 to obtain fabrication related data.

The engineer 306 may collaborate in the IC manufacturing process with other entities of the virtual fab 300 using a computer system 338. The virtual fab 300 enables the engineer 306 to collaborate with other engineers and the design/lab facility 308 in IC design and testing, to monitor fabrication processes at the fab facility 310, and to obtain information regarding test runs, yields, etc. In some embodiments, the engineer 306 may communicate directly with the customer 304 via the virtual fab 300 to address design issues and other concerns.

The design/lab facility 308 provides IC design and testing services that may be accessed by other entities via the virtual fab 300. The design/lab facility 308 may include a computer system 340 and various IC design and testing tools 342. The IC design and testing tools 342 may include both software and hardware.

The fab facility 310 enables the fabrication of ICs. Control of various aspects of the fabrication process, as well as data collected during the fabrication process, may be accessed via the virtual fab 300. The fab facility 310 may include a computer system 344 and various fabrication hardware and software tools and equipment 346. For example, the fab facility 310 may include an ion implantation tool, a chemical vapor deposition tool, a thermal oxidation tool, a sputtering tool, and various optical imaging systems, as well as the software needed to control these components.

The process 312 may represent any process or operation that occurs within the virtual fab 300. For example, the process 312 may be an order process that receives an IC order from the customer 304 via the service system 302, a fabrication process that runs within the fab facility 310, a design process executed by the engineer 306 using the design/lab facility 308, or a communications protocol that facilities communications between the various entities 302–312.

It is understood that the entities 302–312 of the virtual fab 300, as well as their described interconnections, are for purposes of illustration only. For example, it is envisioned that more or fewer entities, both internal and external, may exist within the virtual fab 300, and that some entities may be incorporated into other entities or distributed. For example, the service system 302 may be distributed among the various entities 306–310.

Figure 4:
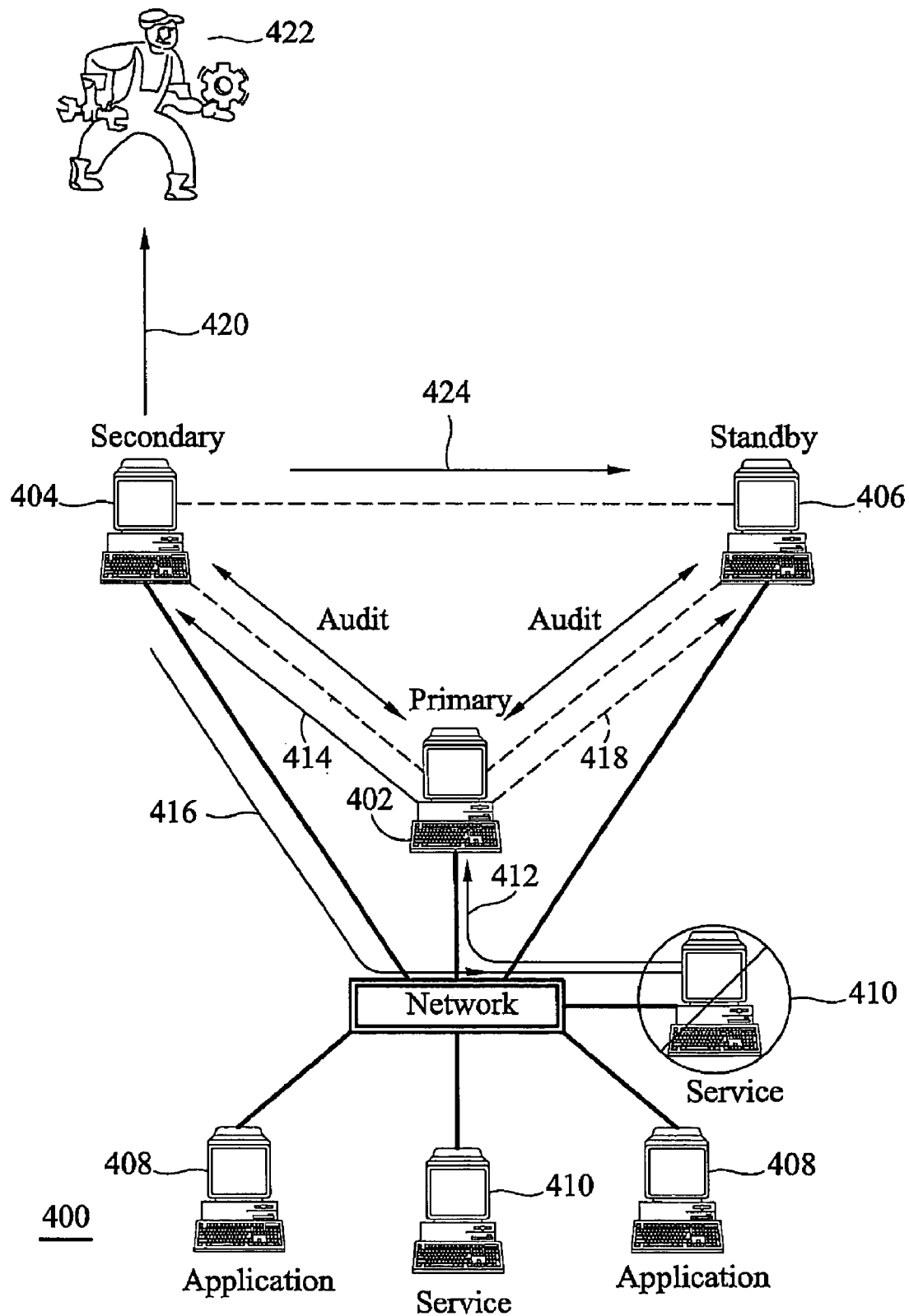
FIG. 4 illustrates a system for providing fault detection and management in a semiconductor manufacturing environment.

Referring now to FIG. 4, semiconductor manufacturing fault detection and management system 400 is provided as an example mechanism for implementing method 100 in virtual fab 200, 300. The monitoring locations of method 100 may be represented by a first monitoring entity or primary monitoring entity 402, a second monitoring entity or secondary monitoring entity 404, and a third monitoring entity or stand-by monitoring entity 406. Such monitoring entities may be coupled to monitor semiconductor manufacturing entities, such as, for example, applications 408 and services 410, both which could represent any entity in the virtual fab 200, 300, such as, for example, service system 302, customer 304, engineer 306, design/lab facility 308, fab facility 310, process 312, or any other user, such as, for example an administrator, a repairman, etc. A plurality system(s) 400 may be coupled to or may be apart of the virtual fab 200, 300. The designation of monitoring entities as "primary," "secondary," or "stand-by" is for illustrative purposes only and is not intended to suggest any functional significance.

In one embodiment, system 400 may provide an alert status to an administrator triggered by a state change in a manufacturing entity, such as, for example, an out-of-spec condition of applications 408 or services 410. An out-of-spec condition may be any outlier parameter of a process or equipment, which should operate or have certain expected characteristics according to a specification. An example of an out-of spec condition in a manufacturing entity may be high particle counts, a sudden change in pressure, incorrect gas flows, a change in material properties as measured from monitor wafers or from the product, an inability to access a database, an incorrect result from a computing system, or corrupted data from a server.

For example, when service entity 410 experiences a state change, a state change notification or an alert 412 is generated. In one embodiment, the alert 412 conditions may detect by the primary monitoring entity 402. Primary monitoring entity 402 may send notice 414 of receipt of the alert 412 to the secondary monitoring entity 404. Secondary monitoring entity 404 may be located at a remote location or may be within close proximity of the primary monitoring entity 402. The secondary monitoring entity 404 may initiate a verification process or secondary check 416 on the service entity 410, utilizing any technique, such as, for example, polling. If secondary monitoring entity 404 detects a state change, then secondary monitoring entity 404 may generate a verified state change notification 420, which could be directed to any entity, such as, for example, a maintenance facility 422 to initiate corrective action. If secondary monitoring entity 404 does not detect a state change, then there may be an issue with the monitoring process and any number of actions may be taken.

In one embodiment, the issues with the monitoring process is assumed to be with the primary monitoring entity and secondary monitoring entity 404 may generate a monitoring entity error notification. Such notification may be used to initiate any type of corrective action. For example, secondary monitoring entity may send notice 424 to a third monitoring entity or stand-by monitoring entity 406 to engage stand-by monitoring entity to begin checking the status of service entity 410. Alternatively, stand-by monitoring entity 406 may be monitoring service 410 constantly. In either case, stand-by monitoring entity 406 may act in place of the primary monitoring entity 402 when it is determined that the monitoring error is associated with primary monitoring entity 402. The stand-by monitoring entity 406 may be located at a remote location or may be within close proximity of primary monitoring entity 402 and secondary monitoring entity 404. The primary monitoring entity 402, secondary monitoring entity 404, and stand-by monitoring entity 406 may reside within a singular or cluster process tool and may be locally or remotely located and coupled to the virtual fab 200, 300.

Alternatively, primary monitoring entity 402 may audit periodically or continually the functionality of secondary monitoring entity 404, such as, for example, polling a condition of secondary monitoring entity to determine whether it is out-of-spec or monitoring interrupt or trap messages sent from secondary monitoring entity 404. If primary monitoring entity 402 detects an out-of-spec condition with secondary monitoring entity 404, then primary monitoring entity 402 may generate a monitoring entity error notification, which could be directed to any entity, such as, for example, a maintenance facility 422 to initiate corrective action. For example, primary monitoring entity may send notice 418 to third monitoring entity or stand-by monitoring entity 406 to engage stand-by monitoring entity to begin checking the status of service entity 410. Alternatively, stand-by monitoring entity 406 may be monitoring service 410 constantly. In either case, stand-by monitoring entity 406 may act in place of the secondary monitoring entity 402 when it is determined it is malfunctioning. It is contemplated that each of the monitoring entities could audit the functionality of the other monitoring entities and send notifications as described above.

Figure 5:
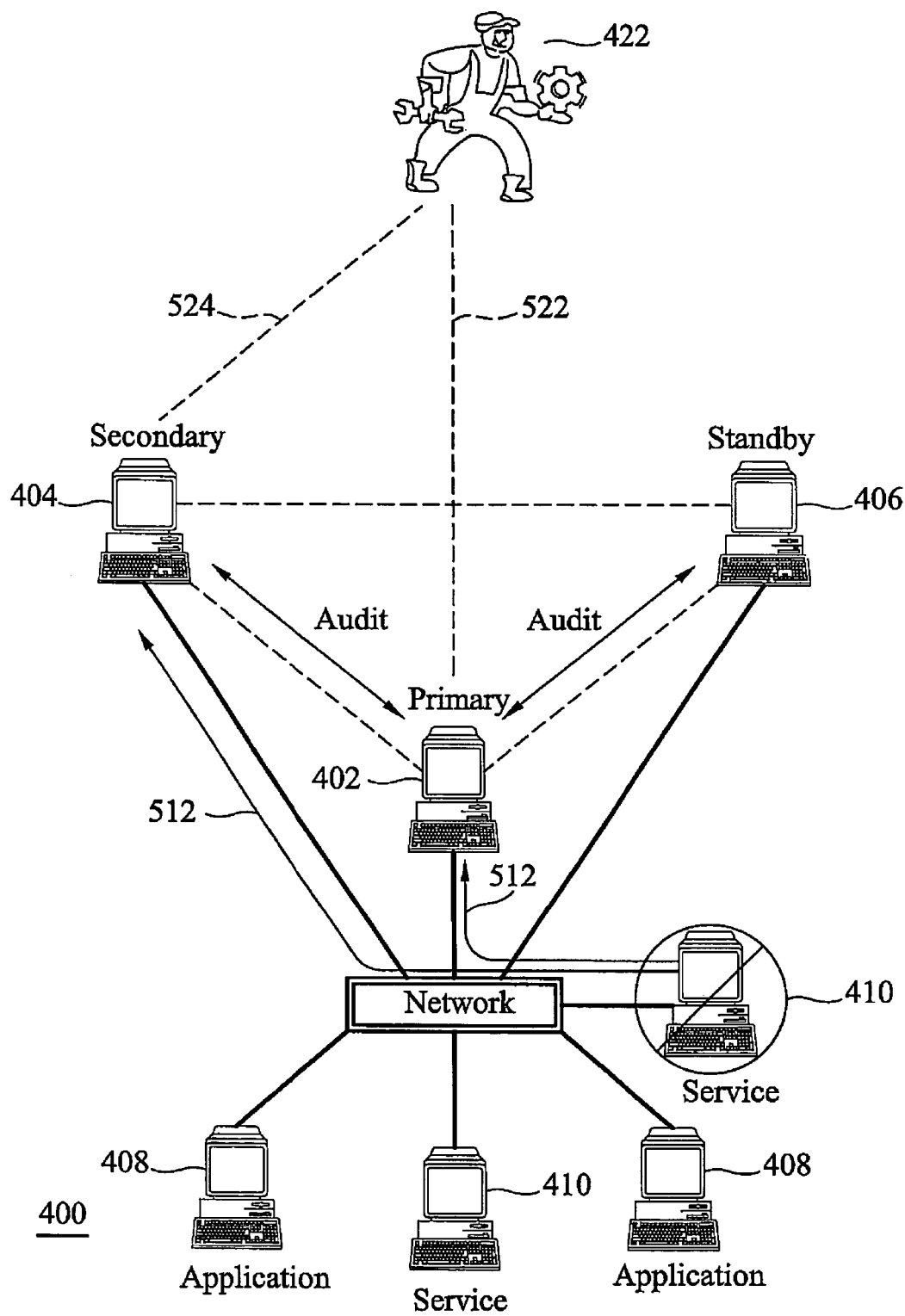
FIG. 5 illustrates an alternate embodiment of the system in FIG. 4 for providing fault detection and management in a semiconductor manufacturing environment.

Referring to FIG. 5, semiconductor manufacturing fault detection and notification system 400 configured differently to implement an alternate embodiment of method 100 in virtual fab 200, 300 is provided. When service entity 410 experiences a state change, such as, for example, an out-of-spec condition, a state change notification or an alert 512 is generated. The alert 512 may detected by the primary monitoring entity 402 and secondary monitoring entity 404. Each primary monitoring entity 402 and secondary monitoring entity 404 may indicate that it received an alert by, for example, generating a notice of receipt of the alert, which may me compared to verify the existence of a state change in service 410. For example, if both monitoring entities receive an alert, then there is a strong likelihood that a state change occurred in service 410 and either primary monitoring entity 402 or secondary monitoring entity 404 may, for example, generate a verified state change notification 522 and 524, respectively, which could be directed to any entity, such as, for example, a maintenance facility 422 to initiate corrective action. On the other hand, if neither the primary monitoring entity 402 nor the secondary monitoring entity 404 detects a state change, then, absent a monitoring entity malfunction, the service 410 probably did not experience a state change. However, if only one of the monitoring entities detects a state change, then there may be an issue with the monitoring process and any number of actions may be taken, such as for example those described above for the system configuration disclosed in FIG. 4.

The comparison of the notices of the receipt of alert from primary monitoring entity 402 and secondary monitoring entity 404 may by any comparison mechanism. For example, the comparison may be performed in the primary monitoring entity 402 or secondary monitoring entity 404 or both, wherein the entity that is not performing the comparison may send the notification to the entity performing the comparison. Alternatively, both monitoring entities could send their notices to a third location to be compared, which could intern generate a monitoring entity malfunction notification.

Figure 6:
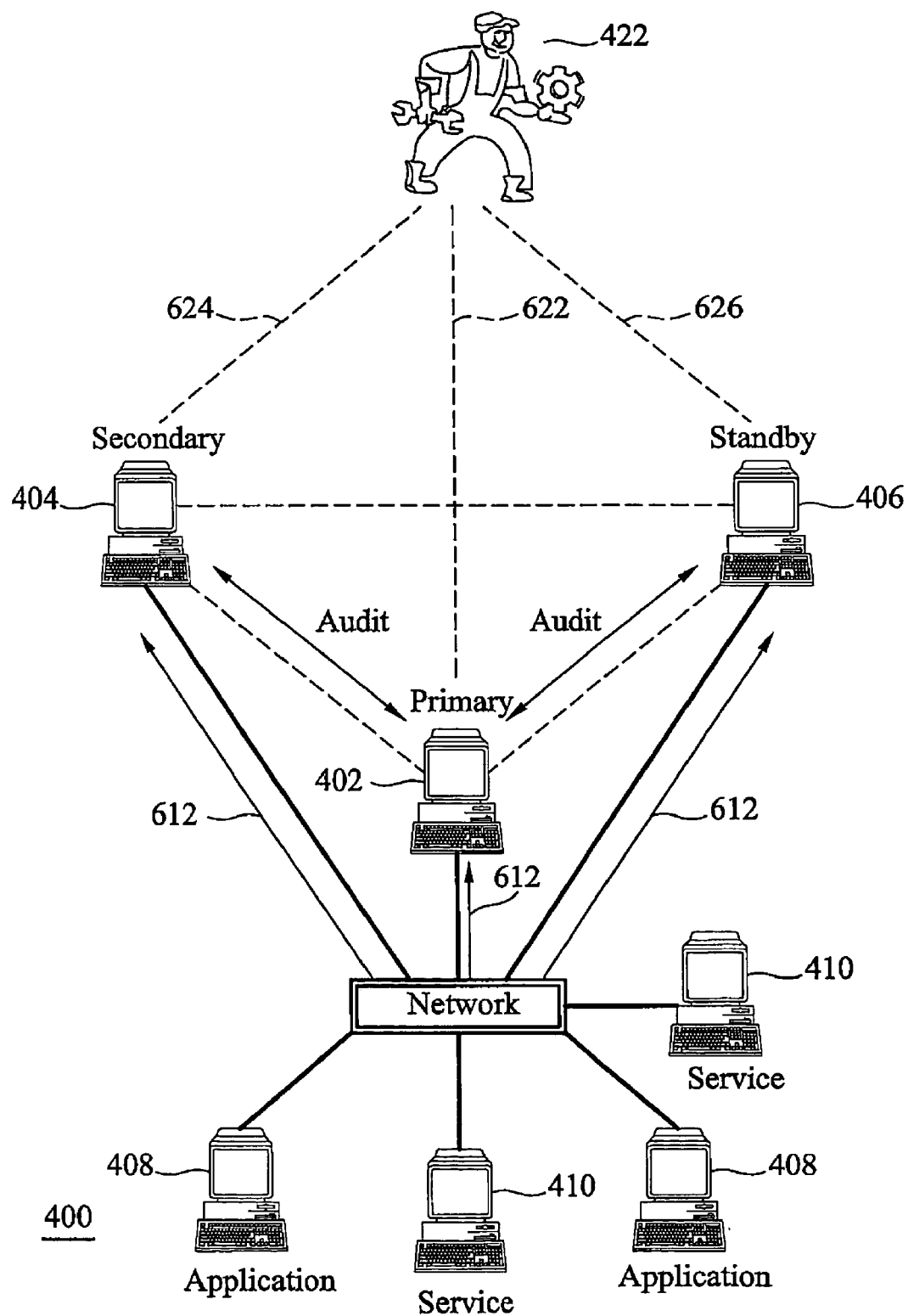
FIG. 6 illustrates another alternate embodiment of the system in Fig. for providing fault detection and management in a semiconductor manufacturing environment.

Referring to FIG. 6, semiconductor manufacturing fault detection and management system 400 configured differently to implement yet another embodiment of method 100 in virtual fab 200, 300, is provided. When service entity 410 experiences a state change, such as, for example, an out-of-spec condition, a state change notification or an alert 612 is generated. Alert 612 may be detected by the primary monitoring entity 402, secondary monitoring entity 404 and stand-by monitoring entity 406. Each of the primary monitoring entity 402, secondary monitoring entity 404 and standby entity may indicate that it is received an alert by, for example, generating a notice of receipt of the alert 612, which may me compared to verify the existence of a state change in service 410. For example, if at least two of the three monitoring entities receive an alert, then there is a strong likelihood that a state change occurred in service 410 and any one of the primary monitoring entity 402, secondary monitoring entity 404 or standby entity 406 may generate a verified state change notification 622, 624 or 626, respectively, which could be directed to any entity, such as, for example, a maintenance facility 422 to initiate corrective action. On the other hand, if none of the monitoring entities detects a state change, then, absent a monitoring entity malfunction, the service 410 probably did not experience a state change. However, if only one of the monitoring entities detects an out-of-spec condition, then there may be an issue with the monitoring process and any number of actions may be taken, such as for example those described above for the system configuration disclosed in FIG. 4.

In all the embodiments shown in FIGS. 4, 5, and 6, it is contemplated that primary monitoring entity 402, secondary monitoring entity 404, and stand-by monitoring entity 406 may constitute separate computers or servers, which may reside in different locations. For example, the primary server may be a system that detects any error or trap messages from any type of system in a semiconductor fabrication environment. The primary server may detect errors or out-of-spec measurements from processes and the process equipment. The primary server may further provide tracking of the secondary server that may also act as the primary server. The secondary server may provide checking or verification of any alerts detected by the primary server and may initiate acts that inform other administrative systems by email, pager, fax, or voice notification. Verification of events by the secondary server or stand-by systems may further include transparent notification events to other servers of a virtual fab 200 that may be automatically executed. The stand-by system may handle alert detection if the secondary or primary system is unable to handle the alert immediately or the stand-by systems can provide verification of alerts initially detected or handled by the primary or secondary systems. The secondary and stand-by systems may provide constant backup handling of alerts and errors. The monitoring entity computers or servers may be the same or different, provided that each is capable of performing its intended function.

It is contemplated that several modification or enhancement to the systems shown in FIG. 4, 5, or 6 may be made without departing from the spirit of the disclosure. For example, each monitoring entity may monitor the functionality of at least one of the other monitoring entities on a periodic or constant basis and notifications may be sent when an error in the monitoring locations are detected. Any condition may be monitored to assure accurate functionality.

Also, the number of monitoring entities employed in the systems described in FIGS. 4, 5, and 6 is not limited to three; any number may be used in the systems.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the disclosure.

The invention claimed is:

1. A semiconductor manufacturing fault detection and management system, the system comprising:
   at least one manufacturing entity;
   a first monitoring entity connected to the manufacturing entity to identify a state change in the manufacturing entity and to generate a state change notification; and
   a second monitoring entity connected to the first monitoring entity and the manufacturing entity to receive the state change notification, determine whether the manufacturing entity experienced a state change, and issue a verified state change notification when the state change is determined in the manufacturing entity.

2. The system of claim 1, wherein the second monitoring entity issues a first monitoring entity error notification when it determines that the manufacturing entity did not experience a state change.

3. The system of claim 1, additionally comprising:
   a third monitoring entity connected to the first monitoring entity, the second monitoring entity and to the manufacturing entity to identify a state change in the manufacturing entity and to generate a state change notification.

4. The system of claim 3, wherein the third monitoring entity is utilized in place of the first monitoring entity in the event that the first monitoring entity fails and the second monitoring entity in the event that the second monitoring entity fails.

5. The system of claim 3, wherein the first monitoring entity, the second monitoring entity and the third monitoring entity are located in separate physical or logical locations.

6. The system of claim 1, wherein the first monitoring entity monitors the functionality of the second monitoring entity and issues a first monitoring entity error notification when it determines that the manufacturing entity did not experience a state change.

7. The system of claim 1, wherein the first monitoring entity and the second monitoring entity are located in separate physical or logical locations.

8. The system of claim 1, wherein the first monitoring entity is configured to receive an interrupt from the manufacturing entity indicating a state change in the manufacturing entity.

9. The system of claim 1, wherein the first monitoring entity is configured to poll the manufacturing entity to identify a state change in the manufacturing entity.

10. The system of claim 1, wherein the first monitoring entity and the second monitoring entity are computers.

11. A semiconductor manufacturing fault detection and management system, the system comprising:
   at least one manufacturing entity;

a first monitoring entity connected to the manufacturing entity to identify a state change in the manufacturing entity and to generate a first monitoring entity state change notification;

a second monitoring entity connected to the manufacturing entity and to the first monitoring entity to identify a state change in the manufacturing entity and to generate a second monitoring entity state change notification when a state change in the manufacturing entity is identified;

a third monitoring entity connected to the manufacturing entity, to the first monitoring entity and to the second monitoring entity to identify a state change in the manufacturing entity and to generate a third monitoring entity state change notification; and a state change detection mechanism configured to monitor the first second and third state change notifications and generate a manufacturing entity state change notification when at least two of the monitoring entity state change notifications are detected.

12. The system of claim 11, wherein the first monitoring entity, the second monitoring entity and the third monitoring entity are located in separate physical or logical locations.

13. The system of claim 11, wherein the first monitoring entity, the second monitoring entity and the third monitoring entity are configured to receive an interrupt from the manufacturing entity indicating a state change in the manufacturing entity.

14. The system of claim 11, wherein the first monitoring entity, the second monitoring entity and the third monitoring entity are configured to poll the manufacturing entity to identify a state change in the manufacturing entity.

15. The system of claim 11, wherein the first monitoring entity, the second monitoring entity and the third monitoring entity are computers.

16. The system of claim 11, additionally comprising:
a monitoring entity malfunction detection mechanism configured to monitor the first, second and third state change notifications and generate a monitoring entity malfunction notification when one or two of the monitoring entity state change notifications are detected, but not all three.

17. A semiconductor manufacturing fault detection and management system, the system comprising:
at least one manufacturing entity;
a first monitoring entity connected to the manufacturing entity to identify a state change in the manufacturing entity and to generate a first monitoring entity state change notification;
a second monitoring entity connected to the manufacturing entity and to the first monitoring entity to identify a state change in the manufacturing entity and to generate a second monitoring entity state change notification when a state change in the manufacturing entity is identified; and
a state change detection mechanism configured to monitor the first and second state change notifications and generate a manufacturing entity state change notification when both of the monitoring entity state change notifications are detected.

18. The system of claim 17, additionally comprising:
a monitoring entity malfunction detection mechanism configured to monitor the first and second state change notifications and generate a monitoring entity malfunction notification when only one of the monitoring entity state change notifications are detected;

a third monitoring entity connected to the monitoring entity malfunction detection mechanism, state change detection mechanism, the manufacturing entity, the first monitoring entity and the second monitoring entity and activated upon the generation of monitoring entity malfunction notification, to identify a state change in the manufacturing entity and to generate a third monitoring entity state change notification.

19. The system of claim 18, wherein the first monitoring entity, the second monitoring entity and the third monitoring entity are located in separate physical locations.

20. The system of claim 17, wherein the first monitoring entity and the second monitoring entity are located in separate physical or logical locations.

21. The system of claim 17, wherein the first monitoring entity and the second monitoring entity are configured to receive an interrupt from the manufacturing entity indicating a state change in the manufacturing entity.

22. The system of claim 17, wherein the first monitoring entity and the second monitoring entity are configured to poll the manufacturing entity to identify a state change in the manufacturing entity.

23. The system of claim 17, wherein the first monitoring entity and the second monitoring entity are computers.

24. A method to detect faults in at least one semiconductor manufacturing entity, the method comprising:
monitoring, from a first location, the manufacturing entity to identify a state change in the manufacturing entity and to generate a first monitoring entity state change notification when a state change in the manufacturing entity is identified;
monitoring, from a second location, the manufacturing entity to identify a state change in the manufacturing entity and to generate a second monitoring entity state change notification when a state change in the manufacturing entity is identified;
generating a manufacturing entity state change notification when the first monitoring entity state change notification and second monitoring entity state change notifications are generated; and
generating a monitoring malfunction notification when only one of the monitoring entity state change notifications are generated.

25. The method of claim 24, additionally comprising:
monitoring, from a third location, the manufacturing entity upon the generation of monitoring malfunction notification, to identify a state change in the manufacturing entity and to generate a third monitoring entity state change notification;
determine the functioning monitoring location; and
generating a manufacturing entity state change notification when the third monitoring entity state change notification and the monitoring entity state change notification from the functioning monitoring location are generated.

26. The method of claim 24, wherein the monitoring of the manufacturing entity comprises polling the manufacturing entity to detect the state change.

27. The method of claim 24, wherein the monitoring of the manufacturing entity comprises receiving interrupt generated by the manufacturing entity.

28. A method to detect faults in at least one semiconductor manufacturing entity, the method comprising:
monitoring, from a first location, the manufacturing entity to identify a state change in the manufacturing entity and to generate a first monitoring entity state change notification when a state change in the manufacturing entity is identified;

monitoring, from a second location, the manufacturing entity to verify a state change in the manufacturing entity when the first monitoring entity state change notification is generated;

generating a verified manufacturing entity state change notification when the state change is verified; and generating a first monitoring entity malfunction notification when the monitoring entity state change is not verified.

29. The method of claim 28, additionally comprising:

replacing the monitoring from the first location with monitoring, from a third location, the manufacturing entity upon the generation of monitoring malfunction notification, to identify a state change in the manufacturing entity and to generate a second monitoring entity state change notification; and wherein the verified manufacturing entity state change notification is generated when second monitoring entity state change notification is received and the state change is verified.

30. The method of claim 28, wherein the monitoring of the manufacturing entity comprises polling the manufacturing entity to detect the state change.

31. The method of claim 28, wherein the monitoring of the manufacturing entity comprises receiving interrupt generated by the manufacturing entity.

* * * * *